United States Patent [19]

Kaesler et al.

[11] Patent Number: 4,800,071

[45] Date of Patent: Jan. 24, 1989

[54] FILTRATION AIDS FOR REMOVAL OF CALCIUM SOLIDS FROM AQUEOUS PHOSPHORIC ACID

[75] Inventors: Ralph W. Kaesler, Barrington, Ill.; Donald G. Robinson, Lakeland, Fla.; Wayne L. Moss, Columbia, S.C.; Brian K. Failon, Wheaton, Ill.

[73] Assignee: Nalco Chemical Company, Naperville, Ill.

[21] Appl. No.: 189,870

[22] Filed: May 3, 1988

[51] Int. Cl.$^4$ .................. C01B 25/16; B01D 21/01; B03D 3/00; C02F 1/52

[52] U.S. Cl. .................. 423/321 R; 423/320; 210/734; 210/778

[58] Field of Search ............... 423/320, 321 R, 321 S, 423/167; 210/734, 778

[56] References Cited

U.S. PATENT DOCUMENTS

| | | | |
|---|---|---|---|
| Re. 28,474 | 7/1974 | Anderson et al. | 260/29.6 H |
| Re. 28,576 | 10/1975 | Anderson et al. | 260/29.61 H |
| 3,192,014 | 6/1965 | Leyshon et al. | 423/320 |
| 3,284,393 | 11/1966 | Vanderhoff et al. | 260/29.6 |
| 3,624,019 | 11/1971 | Anderson et al. | 260/29.6 H |
| 3,644,091 | 2/1972 | Naschke et al. | 23/165 |
| 3,692,673 | 8/1972 | Hoke | 210/734 |
| 3,734,873 | 5/1973 | Anderson et al. | 260/29.6 H |
| 3,767,629 | 10/1973 | Vallino, Jr. et al. | 260/80.3 N |
| 3,826,771 | 7/1974 | Anderson et al. | 260/29.6 H |
| 3,915,920 | 10/1975 | Slovinsky et al. | 260/29.6 RW |
| 3,996,180 | 12/1976 | Kane | 260/29.6 H |
| 3,997,492 | 12/1976 | Kane et al. | 260/29.6 WQ |
| 4,024,097 | 5/1977 | Slovinsky et al. | 260/29.6 N |
| 4,049,774 | 9/1977 | Harper et al. | 423/320 |
| 4,291,005 | 9/1981 | Poulos et al. | 423/320 |
| 4,332,779 | 6/1982 | Thibodeau et al. | 423/321 R |
| 4,342,653 | 8/1982 | Halverson | 210/734 |
| 4,569,768 | 2/1986 | McKinley | 210/734 |
| 4,587,108 | 5/1986 | MacDonald | 210/734 |
| 4,683,066 | 7/1987 | Rose et al. | 210/734 |
| 4,703,092 | 10/1987 | Fong | 525/351 |
| 4,741,838 | 5/1988 | Sharpe | 210/734 |

FOREIGN PATENT DOCUMENTS 0225596 12/1986 European Pat. Off. .

*Primary Examiner*—Gregory A. Heller
*Attorney, Agent, or Firm*—John G. Premo; Anthony L. Cupoli; Donald G. Epple

[57] ABSTRACT

Separation of gypsum from phosphoric acid liquor produced during the production of phosphoric acid from finely ground phosphate rock. These aids are characterized as containing sulfonate and acrylamide.

5 Claims, No Drawings

FILTRATION AIDS FOR REMOVAL OF CALCIUM SOLIDS FROM AQUEOUS PHOSPHORIC ACID

FIELD OF THE INVENTION

The invention is a filtration aid and its use in the production of phosphoric acid.

BACKGROUND OF THE INVENTION

In the preparation of phosphoric acid finely ground phosphate rock is slurried with water, recycled phosphoric acid slurry, and sulfuric acid and heated at 165–190° F. for 2–8 hours. This allows the conversion of the phosphate component of the phosphate rock to phosphoric acid and the precipitation of calcium component of the phosphate rock as gypsum many times in the form of calcium sulfate dihydrate. The undissolved rock and the newly formed gypsum together with gangue are removed from the phosphoric acid liquid phase by a filtration step. The phosphoric acid industry uses horizontal pan filters almost exclusively in this process (usually Prayon Filters manufactured by Bird Engineering). The filtrate typically ( 26–32% $P_2O_5$ or 40% $H_3PO_4$) is retained and the filter cake is discharged as waste. The acid solution is typically concentrated in vacuum evaporators to 54% $P_2O_5$ ( 100% $H_3PO_4$) or concentrated further in super acid evaporates to as high as 72% $P_2O_5$.

If phosphoric acid production in the plant is limited by filter capacity, improvements in filter efficiency can have a large commercial impact. In general, a demonstrated improvement in filtration rates exceeding 5% is considered very significant.

The conditioning of filter feed with high molecular weight polyacrylamide and acrylamide/sodium acrylate copolymer to improve gypsum filtration rates has been previously reported in the literature. However, no reference teaches the use of sulfonated acrylamide copolymers to improve gypsum filtration rates.

In fact, U.S. Pat. No. 3,644,091 teaches that sulfonated polyacrylamide and its sodium salts are noneffective in coagulating dispersed solids in the wet phosphoric acid process.

It would be beneficial to find other polymers which would be useful as filtration aids to improve the filtration rates in the production of phosphoric acid.

THE INVENTION

We have found that sulfonated acrylamide containing polymers serve as filtration aids in facilities producing a phosphoric acid. These filtration aids enhance the removal of precipitated calcium sulfate dihydrate (gypsum) from the phosphoric acid containing liquor.

We have found, that it is the use of sulfonate in the acrylamide polymer which is important not the percentage of sulfonate used. Our tests have shown good results using as little as 5 mole percent sulfonate and higher than 25 mole % sulfonate Our tests indicate that compounds having greater than 35 mole percent sulfonate should be usable.

Thus, we would expect, that less than 5 mole percent sulfonate can be used or more than 50 mole percent sulfonate. The optimal dosage of sulfonate can be readily determined by those skilled in the use of filtration aids. Generally, the preferred polymer will contain 5-35 mole % sulfonate and more preferably from 5-25 mole % sulfonate, and most preferably 5-15 mole % sulfonate.

We have found, that the polymers containing sulfonate are useful regardless of their RSV. However, it is expected that flocculants would typically have an RSV of at least 10.

RSV is defined to be the Reduced Specific Viscosity of a polymer measured at 0.045 grams of polymers per 100 grams of a IN aqueous sodium nitrate solution measured at 25° C.

Generally, the higher the mole % acrylamide, the better. Our tests show that from 50–89 mole % acrylamide works. Based on those tests we would expect less than 50 mole % acrylamde to provide satisfactory results. The appropriate amount can be readily determined by one skilled in the art. Preferably 50 mole % percent acrylamide to 99 mole % acrylamide will be used. More preferably 75–99 mole % acrylamide.

Generally from 0–40 mole % acrylate may also be used in a terpolymer of acrylamide, acrylate, and sulfoanted monomer. Preferably from 0–25 mole % will be used.

It is understood that the term "acrylate" includes acrylic acid, and its various salts such as sodium, or potassium, or ammonium, or calcium acrylate and the like.

It is understood that the term "sulfonate" includes sulfonic acid and its various satls such as sodium, or potassium, or ammonium or calcium sulfonate and the like.

THE TESTS

Each set in the Tables below represents data from filtration tests conducted on a single slurry sample. Filtration were conducted with 250 ml of conditioned slurry at constant vacuum (18 psi) using a Millipore apparatus and involved conditioning 250 ml of filter feed by pre-stirring the slurry inside a beaker by hand with a small spatula for 30 sec following by hand stirring for another 30 sec (or 15 sec) after addition of the polymer.

In order to impart more shear during conditioning, some tests involved mixing 250 ml of slurry inside of 1000 ml graduated cylinder by using a hand plunger (circular perforated metal disk, connected to a metal rod) at a frequency of about 150 plunges/min. Those tests are designated with tables by the use of the term "plunger".

All polymers were used at a concentration of 1.0%.

DEFINITIONS

"ppm" as used in this specification is based on the total weight of the phosphoric slurry being treated.

THE TABLES

Table I provides a summary of the polymer characteristics for sulfonated polymers that were recently tested at a phosphoric acid producing facility.

TABLE I

FLOCCULANT EVALUATION
POLYMER CHARACTERISTICS

| Product | Composition (Mole %) | | | RSV | Weight % Polymer Solids |
|---|---|---|---|---|---|
| | Sulfonate | Acrylate | AcAm | | |
| A | 11[1] | — | 89 | 39 | 28 |
| B | 11[1] | — | 89 | 25 | 28 |
| C | 11[1] | — | 89 | 17–20 | 28 |
| D | 11[1] | — | 89 | 16 | 29 |

TABLE I-continued

FLOCCULANT EVALUATION
POLYMER CHARACTERISTICS

| Product | Composition (Mole %) Sulfonate | Acrylate | AcAm | RSV | Weight % Polymer Solids |
|---|---|---|---|---|---|
| E | 5[1] | — | 95 | 31 | 29 |
| F | 20[1] | — | 80 | 20 | 29 |
| G | 35[1] | — | 65 | 16 | 29 |
| H | 50[1] | — | 50 | 13 | 29 |
| I | 10[1] | 10 | 80 | 26 | 34.5 |
| J | 25[1] | 25 | 50 | 22 | 29 |
| K | 5[1] | 20 | 75 | 32 | 34.5 |
| L | 15[1] | 5 | 80 | 25 | 34.5 |
| S | 12[1] | 33 | 55 | 30 | 29 |
| M | 9.4[2] | 31.4 | 59.2 | 45 | 24.7 |
| N | 10[2] | 36 | 54 | 35 | 25 |
| O | 9.7[2] | 38.5 | 51.8 | 48 | 25 |
| P | — | — | 100 | 16-24 | 28 |
| Q | — | 17.5 | 82.5 | 16-24 | 28 |
| R | — | 31 | 79 | 30-36 | 35 |

[1]Salt of AMPS. AMPS is a trademark of the Lubrizol Corporation for 2-acrylamido-2-methylpropanesulfonic acid. These polymers were prepared by inverse emulsion polymerization.
[2]2-acrylamidoethanesulfonate: These polymers were prepared by the sulfoethylation of polyacrylamide.

As shown in Table II, the optimum dosage for current Product C under low shear was 20 ppm (Sets 1 and 2). Under these conditions C gave an average decrease in filtration time of 25% over no treatment at all (Sets 1, 3-4). Under high shear conditions, the dosage requirements were higher, and with 50 ppm of Product C, the average decrease in filtration time over no polymer treatment was 20% (Sets 6-8).

TABLE II

PHOSPHORIC ACID FILTRATION STUDIES AT PLANT A
PRODUCT C VS NO POLYMER TREATMENT

| Set | Polymer Program | Dosage (ppm) | Mixing (sec) | Filtration Time (sec) | % Increase (+) or Decrease (−) in Filtration Time |
|---|---|---|---|---|---|
| (a) | Low Shear | | | | |
| 1 | — | — | hand (30) | 29.7 | — |
|   | C | 10 | hand (30) | 24.6 | −17.2 |
|   | C | 20 | hand (30) | 20.9 | −29.6 |
| 2 | C | 50 | hand (30) | 23.1 | −2.5 |
|   | C | 100 | hand (30) | 28.2 | +19.0 |
|   | — | — | hand (30) | 23.7 | — |
| 3 | C | 20 | hand (30) | 21.6 | −22.9 |
|   | — | — | hand (30) | 28.1 | — |
|   | — | — | hand (30) | 27.9 | — |
| 4 | — | — | hand (30) | 27.9 | — |
|   | C | 20 | hand (30) | 20.5 | −23.5 |
|   | — | — | hand (30) | 25.7 | — |
| 5 | — | — | hand (30) | 25.8 | — |
|   | C | 20 | hand (30) | 19.6 | −24.0 |
| (b) | High Shear | | | | |
| 6 | — | — | plunger (30) | 28.3 | — |
|   | C | 20 | plunger (30) | 24.2 | −14.5 |
| 7 | — | — | plunger (30) | 26.6 | — |
|   | C | 50 | plunger (30) | 20.8 | −21.2 |
| 8 | — | — | plunger (30) | 22.3 | — |
|   | C | 50 | plunger (30) | 18.1 | −18.8 |

Other products containing sulfonate functional groups gave improvements in filtration times very similar to Product C (Table III). These include copolymers of AMPS and AcAm and terpolymer AMPS, NaAc and AcAm terpolymers (Sets 1-15), analogs of Product C with RSV's ranging from 15.9 to 38.9 (Sets 9-11) and polymers transamidated with sodium taurate (i.e. Sets 6-8). The only real exception was Product H (50 mole % NaAMPS) which at a dosage of 20 ppm gave a 19.1% decrease in filtration rate over Product C. This improved to near equivalent filtration rates on doubling the dosage.

TABLE III

PHOSPHORIC ACID FILTRATION STUDIES AT PLANT A
OTHER PRODUCTS VS PRODUCT C

| Set | Polymer Program | Dosage (ppm) | Mixing (sec) | Filtration Time (sec) | % Increase (+) or Decrease (−) in Filtration Time |
|---|---|---|---|---|---|
| 1 | C | 20 | hand (30) | 20.2 | — |
|   | I | 20 | hand (30) | 20.26 | +0.8 |
|   | C | 20 | hand (30) | 20.0 | — |
| 2 | C | 20 | hand (30) | 20.8 | — |
|   | J | 20 | hand (30) | 20.3 | −3.8 |
|   | C | 20 | hand (30) | 21.4 | — |
| 3 | C | 20 | hand (30) | 20.8 | — |
|   | K | 20 | hand (30) | 21.5 | +4.1 |
|   | C | 20 | hand (30) | 20.5 | — |
| 4 | C | 20 | hand (30) | 20.2 | — |
|   | S | 20 | hand (30) | 21.1 | +3.9 |
|   | C | 20 | hand (30) | 20.4 | — |
| 5 | C | 20 | hand (30) | 20.8 | — |
|   | L | 20 | hand (30) | 20.3 | −2.2 |
|   | C | 20 | hand (30) | 20.7 | — |
| 6 | C | 20 | hand (30) | 22.3 | — |
|   | M | 20 | hand (30) | 20.4 | −4.9 |
|   | C | 20 | hand (30) | 20.6 | — |
| 7 | C | 20 | hand (30) | 20.1 | — |
|   | N | 20 | hand (30) | 19.6 | +2.7 |
|   | C | 20 | hand (30) | 20.3 | — |
| 8 | C | 20 | hand (30) | 20.5 | — |
|   | O | 20 | hand (30) | 20.7 | +2.7 |
|   | C | 20 | hand (30) | 19.8 | — |
| 9 | C | 20 | hand (30) | 21.5 | — |
|   | C | 20 | hand (30) | 20.7 | — |
|   | A | 20 | hand (30) | 21.0 | −1.2 |
| 10 | C | 20 | hand (30) | 20.8 | — |
|   | B | 20 | hand (30) | 21.2 | +1.9 |
| 11 | C | 20 | hand (30) | 20.6 | — |
|   | D | 20 | hand (30) | 20.2 | −1.9 |
| 12 | C | 20 | hand (30) | 21.4 | — |
|   | C | 20 | hand (30) | 20.5 | — |
|   | E | 20 | hand (30) | 21.5 | +2.6 |
| 13 | C | 20 | hand (30) | 21.2 | — |
|   | F | 20 | hand (30) | 10.3 | −4.2 |
| 14 | C | 20 | hand (30) | 19.9 | — |
|   | H | 20 | hand (30) | 23.7 | +19.1 |
| 15 | C | 20 | hand (30) | 20.2 | — |
|   | H | 40 | hand (30) | 21.0 | +2.9 |
|   | C | 20 | hand (30) | 20.6 | — |

Product C was also compared against NaAc-AcAm copolymer Product R (Table IV). Under low shear conditions and near or below optimum dosage levels, treatment with Product C resulted in filtration times 4-10% lower than treatments with Product R on an equal actives basis (Sets 1-4). At dosages higher than optimum and under similar mixing conditions, Product R proved more effective (Set 5). Under high shear conditions, Product C gave 6-28% lower filtration times than Product R (Sets 6-8). Again, better performance was seen at or below optimum dosage levels. Thus Product C resistance to shear (i.e. relative shear insensitivity) represents an improvement over the nonsulfonated polyacrylamides or nonsulfonated acrylamide/acrylate copolymers currently used in the industry.

TABLE IV

PHOSPHORIC ACID FILTRATION STUDIES AT PLANT A
PRODUCT C VS. PRODUCT R

| Set | Polymer Program | Dosage (ppm) | Mixing (sec) | Filtration Time (sec) | % Increase (+) or Decrease (−) in Filtration Time |
|---|---|---|---|---|---|
| (a) | Low Shear | | | | |
| 1 | C | 10 | hand (30) | 21.0 | — |
|   | R | 8  | hand (30) | 23.1 | +10.0 |
| 2 | C | 20 | hand (30) | 19.6 | — |
|   | R | 16 | hand (30) | 20.8 | +6.1 |
| 3 | C | 20 | hand (30) | 20.8 | — |
|   | R | 16 | hand (30) | 21.5 | +3.5 |
| 4 | C | 20 | hand (15) | 16.4 | — |
|   | R | 16 | hand (15) | 17.4 | +6.1 |
| 5 | C | 50 | hand (30) | 22.5 | — |
|   | R | 40 | hand (30) | 20.0 | −11.1 |
| (b) | High Shear | | | | |
| 6 | C | 20 | plunger (30) | 24.2 | — |
|   | R | 16 | plunger (30) | 27.2 | +12.4 |
| 7 | C | 20 | plunger (30) | 19.5 | — |
|   | R | 16 | plunger (30) | 25.0 | +28.2 |
| 8 | C | 50 | plunger (30) | 20.8 | — |
|   | R | 40 | plunger (30) | 22.0 | +5.8 |

Product C was also briefly evaluated at another phosphoric acid production facility. At that facility B was found to be the only anionic polymer yielding any significant improvement in filtration rates (Table V). Improvements in filtration rates over blanks with no polymer treatment at near optimum dosage levels ranged from 6 to 14% for Product C.

TABLE V

PHOSPHORIC ACID FILTRATION STUDIES AT PLANT B

| Set (a) | Polymer Program Low Shear | Dosage (ppm) | Mixing (sec) | Filtration Time (sec) | % Increase (+) or Decrease (−) in Filtration Time |
|---|---|---|---|---|---|
| | Blank | — | hand (30) | 36 | — |
| | C | 50 | hand (30) | 40 | +12.7 |
| | C | 20 | hand (30) | 31 | −12.7 |
| | Blank | — | hand (30) | 35 | — |
| | Blank | — | hand (30) | 36 | — |
| | C | 12 | hand (30) | 32 | −13.5 |
| | C | 32 | hand (30) | 32 | −13.5 |
| | Blank | — | hand (30) | 38 | — |
| | Blank | — | hand (30) | 36 | — |
| | R | 12 | hand (30) | 41 | +13.9 |
| | R | 32 | hand (30) | 46 | +27.8 |
| | R | 6  | hand (30) | 41 | +13.9 |
| | Blank | — | hand (30) | 34 | — |
| | T | 12 | hand (30) | 45 | +32.4 |
| | C | 12 | hand (30) | 32 | −5.9 |
| | Blank | — | hand (30) | 34 | — |
| | Blank | — | hand (30) | 32 | — |
| | P | 12 | hand (30) | 45 | +36.4 |
| | C | 12 | hand (30) | 28 | −15.2 |
| | Blank | — | hand (30) | 34 | — |
| | Blank | — | hand (30) | 29 | — |
| | U | 12 | hand (30) | 39 | +32.2 |
| | U | 32 | hand (30) | 29 | −1.7 |
| | Blank | — | hand (30) | 30 | — |

Dosage

Those skilled in the art realize polymer dosage is a function of the particular system being treated. Treatment will vary with application point, shear conditions, particle size, percent solids content of the slurry, etc. The specific data we generated expressly shows that 10–50 ppm works well. The "effective dosages" will be higher and lower depending on variations in the above parimeters. The actual dosage to be used is readily ascertained by those skilled in the art.

The Polymers

The sodium AMPS containing polymers and homopolymers and copolymers of acrylamide and/or sodium acrylate are commercially available or can be prepared by anyone skilled in the art. The sulfomethylated acrylamide polymers which are not sodium AMPS polymers, can be prepared as described below:

Preparation of the N-Sulfoethyl Acrylamide Polymers

The N-sulfoethyl acrylamide polymer were prepared by the sulfoethylation of polysoap latices of acrylamide containing polymers including polyacrylamides (PAM) and copolymers of acrylamide and acrylic acid (PAA) by reacting a water-in-oil polysoap latex of acrylamide containing polymer with taurine or sodium taurate wherein the percentage weight of water to the aggregate weight of water and polymer is between 45 and 90%, at elevated temperatures about 120° C. and superatmospheric pressures and for a time sufficient to sulfoethylate said polymer and produce a latex polymer containing sulfoethylacrylamide, acrylate and acrylamide mer units and having areduced specific viscosity greater than the original PAM, and preferably an RSV above about 18 to 20.

The starting aqueous phase of the latex reaction mixture has, as indicated above, a water to water and polymer solids content ratio of from 45 to about 90%. Preferably the percentage of water is from 50% to 70%.

The sulfoethylation process of the present invention is carried out in a latex. In the most preferred form the process is carried out in the aqueous phase of a water-in-oil emulsion which is stable at temperatures of up to 160° C. and above. In this procedure using polysoap lattices a high molecular weight polymer starting material may be used in contrast to solution polymerizations wherein high molecular weights exceeding above one million in about 10% solution result in thickened gels which are very difficult to process. In the preferred form of the instant process the water phase of the polysoap latex of an acrylamide containing polymer in water-in-oil emulsion form is reacted with taurine or sodium taurate as hereinafter described to produce sulfoethylated acrylamide containing polymers as water-in-oil latices which have RSV of at least 18. The so-called oil phase of emulsion is preferably a water immiscible organic solvent, preferably a Low Odor Paraffinic Solvent (LOPS) having minimal odor. The water-in-oil latex of the polysoap PAM or PAA used as a starting material is prepared using a surfactant or mixture of surfactants, preferably include a polysoap surfactant, which may be exemplified by Rapisol B-246, PA-18.

Rapisol B-246 is a ABA block copolymer where A=12-hydroxystearate (MW@1500) and B=polyethylene oxide (MW@1500) with a hdyrophylic-hydrophobic balance (HLB) of 5–6. P-18 is a 1:1 copolymer of 1-octadecene and maleic anhydride with a molecular weight of about 50,000 and sold by Gulf Chemical Co.

The polyacrylamide containing polymers PAM and PAA starting material is preferably a water-in-oil latex where the polymer that has a molecular weight (Mw) of at least 1 million, preferably from 2 million to 15 million or more, up to as high as 25 million. Polymers with RSV's in the order of 22 have a molecular weight of about 10 million.

Batch procedures were used wherein all the ingredients and reactants are included in the aqueous batch reaction mixture at the outset of the reaction.

In the present process a water-in-oil polysoap latex of PAM or PAA is adjusted to have a water content of at least 45% aqueous which the taurine or sodium taurate reactant is added. The taurine or sodium taurate sulfoethylating agent or reactant is used in amounts up to 50 mole percent (%) or more based on the total mer unit content of the polymer. The sulfoethylation process may be carried out using taurine (2-aminoethanesulfonic acid or $NH_2C_2H_4-SO_3H$) or an ammonium, amine, alkali metal or alkaline earth metal salt thereof such as for example sodium taurate. The reaction mixture in a preferred form also contains added low odor paraffinic solvent (LOPS) and added surfactants such as Span 80 (Sorbitan monostearate) or preferably a polysoap surfactant such as P-18, a 1:1 copolymer of 1-octadecene and maleic anhydride, sold by Gulf Chemicals Co. or other polysoap surfactants which produce latices stable up to 160° C. Another preferred polysoap surfactant is Rapisol B-246 an ABA block copolymer where A=12-hydroxy stearate (molecular wt.@1500) and B=polyethylene oxide (molecular wt.@1500) with an HLB (hydrophilic-lipophilic balance) of 5-6, manufactured by ICI America.

The water-in-oil polysoap latex of PAM or PAA used in a starting material is a copolysoap stabilized water-in-oil latex emulsion in which the oil or solvent phase is a paraffinic solvent such as LOPS (Low Odor Paraffinic solvent). The starting PAM or PAA lattices used as starting materials may have RSV's from 5 and above and preferably from 18 to 50.

The sulfoethylation process of the invention is carried out at a temperature of at least 120° C. up to about 180° C. for a time period of about 30 minutes to 6 hours or more. Preferred temperatures ranges are from about 130° to 160° C. A preferred reaction time ranges from 1 to 6 hours.

Alternatively she process can be carried out in the presence of varying amounts of NaOH or HCl which in turn controls the amount of carboxylate formation. The taurine or taurate is used at least up to 80 mole percent based on acrylamide. Because the temperatures of the reaction exceed 100° C., the process is carried out in a closed reactor under superatmospheric pressure. One convenient reactor is a Paar bomb.

It has been found that the sulfoethylation process of the present invention is carried out in latex reaction mixtures.

The polymers may be either prepared or used in the form of the free acids or as their water-soluble salts, e.g. sodium, potassium or ammonium or such forms are considered to be equivalents.

The Preparation of the Water-In-Oil Emulsions Of Water-Soluble Vinyl Addition Polymers The general method for the preparation of emulsions of the type described above is contained in Vanderhoff, U.S. Pat. No. 3,284,393. A typical procedure for preparing water-in-oil emulsions of this type includes preparing an aqueous solution of a water-soluble acrylic acid monomer and adding this solution to one of the hydrocarbon oils described above. With the addition of a suitable water-in-oil emulsifying agent and under agitation, the emulsion is then subjected to free radical polymerization conditions and a water-in-oil emulsion of the water-soluble acrylic acid polymer is obtained. It should be pointed out that the ingredients are chosen based upon the weight percentages given above and their compatability with each other. As to choice of free radical catalyst, these materials may be either oil or water-soluble and may be from the group consisting of organic peroxides, Vazo type materials, redox type initiator systems, etc. Additionally, ultraviolet light, microwaves, etc. will also cause the polymerization of water-in-oil emulsions of this type.

In the manufacture of emulsions of this type, which are further detailed in U.S. Pat. Nos. 3,624,019, 3,734,873, Re. 28,576, 3,826,771, all of which are incorporated by reference. The use of air may be employed to control polymerization. This technique is described in U.S. Pat. No. 3,767,629 which is also hereinafter incorporated by reference.

In addition to the above references, U.S. Pat. No. 3,996,180 describes the preparation of water-in-oil emulsions of the types utilized in this invention by first forming an emulsion containing small particle size droplets between the oil, water, monomer and water-in-oil emulsifying agent utilizing a high shear mixing technique followed by subjecting this emulsion to free radical polymerization conditions. Also of interest is U.S. Pat. No. 4,024,097 which describes water-in-oil emulsions such as those described above utilizing particular surfactant systems for the water-in-oil emulsifying agent, allowing for the preparation of latexes having small polymer particle sizes and improved storage stability.

Another reference, U.S. Pat. No. 3,915,920, discloses stabilizing water-in-oil emulsions of the type above described utilizing various oil-soluble polymers such as polyisobutylene. Employment of techniques of this type provides for superior stabilized emulsions.

Of still further interest is U.S. Pat. No. 3,997,492 which describes the formation of water-in-oil emulsions of the type above described utilizing emulsifiers having HLB values of between 4-9.

Physical Properties of The Water-In-Oil Emulsions

The water-in-oil emulsions of the finely divided water-soluble acrylic acid polymers useful in this invention contain relatively large amounts of polymer. The polymers dispersed in the emulsion are quite stable when the particle size of the polymer is from the range of 0.1 microns up to about 5 microns. The preferred particle size is generally within the range of 0.2 microns to about 3 microns. A most preferred particle size is generally within the range of 0.2 to 2.0 microns.

The emulsions prepared having the above composition generally have a viscosity in the range of from 50 to 3,000 cps. It will be seen, however, that the viscosity of these emulsions can be affected greatly by increasing or decreasing the polymer content, oil content, or water content as well as the choice of a suitable water-in-oil emulsifier.

Another factor attributing to she viscosity of types of emulsions is the particle size of she polymer which is dispersed in the discontinuous aqueous phase. Gnerally, the smaller the particle obtained the less viscous the emulsion. At any rate, it will be readily apparent to those skilled in the art as to how the viscosity of these typ]es of materials can be altered. It will be seen that all that is important in this invention is the fact that the emulsion be somewhat fluid, ie: pumpable.

The Inversion of the Water-In-Oil Emulsions of the Water-Soluble Vinyl Addition Polymers The water-in-oil emulsions of the water-soluble acrylic acid polymers discussed above have unique ability to rapidly invert when added to aqueous solution in the presence of an inverting agent or physical stress. Upon inversion, the emulsion releases the polymer into water in a very short period of time when compared to the length of time required to dissolve a solid form of the polymer. This inversion technique is described in U.S. Pat. No. 3,624,019, hereinafter incorporated by reference. As stated in this reference, the polymer-containing emulsions may be inverted by any number of means. The most convenient means resides in the use of surfactant added to either the polymer-containing emulsion or the water into which it is to be placed. The placement of a surfactant into the water causes the emulsion to rapidly invert and release the polymer in the form of an aqueous solution. When this technique is used to invert the polymer-containing emulsions the amount of surfactant present in the water may vary over a range of 0.01 to 50% based on the polymer. Good inversion often occurs within the range of 1.0–10% based on polymer.

The preferred surfactants utilized to cause the inversion of the water-in-oil emulsion of this invention when the emulsion is added to water are hydrophillic and are further characterized as being water soluble. Any hydrophillic type surfactant such as ethoxylated nonyl phenols, ethoxylated nonyl phenol formaldehyde resins, dioctyl esters of sodium succinate and octyl phenol polyethyoxy ethanols, etc. can be used.

Preferred surfactants are generally nonyl phenols which have been ethoxylated with between 8–15 moles of ethylene oxide. A more complete list of surfactants used to invert the emulsion are found in Anderson, U.S. Pat. No. 3,624,019 at columns 4 and 5.

For more details with respect to the terpolymers described above and their method of preparation, reference may be had to U.S. Pat. No. 4,703,092 and European Patent Application No. 0 225 596, the disclosures of which are incorporated herein by reference.

Having now described our invention we claim as follows:

1. A method for increasing the filtration rate for the removal of gypsum and gangue from phosphoric acid in a phosphoric acid production facility comprising the addition of a sulfonated acrylamide polymer containing at least about 1 mole percent sulfonate and having an RSV of at least 10, sulfonated polymer being selected from the group consisting of 2-acrylamido-2-methlpropanesulfonate/acrylamide, 2-acrylamido-2-methylpropanesulfonate acrylate/acrylamide and 2-acrylamidoethanesulfonate/acrylate/acrylamide.

2. The method of claim 1 wherein said polymer has an RSV of at least about 5.

3. The method of claim 2 wherein said polymer is 2-acrylamide-2-methylpropanesulfonate/acrylate/acrylamide having from 5–35 mole percent sulfonate, from 5–35 mole percent acrylate, and from 50–90 mole percent acrylamide.

4. The method of claim 2 wherein said polymer is 2-acrylamido-2-methylpropanesulfonate/acrylamide and has from 5–35 mole percent sulfonate and from 65–95 mole percent acrylamide.

5. The method of claim 2, wherein said polymer is a 2-acrylamidoethanesulfonate/acrylate/acrylamide and has from 5–15 mole percent sulfonate 25–45 mole % acrylate, and 45–70 mole pecent acrylamide.

* * * * *